US006283856B1

(12) United States Patent
Mothwurf

(10) Patent No.: US 6,283,856 B1
(45) Date of Patent: Sep. 4, 2001

(54) PATRON AND CROUPIER ASSESSMENT IN ROULETTE

(75) Inventor: Ewald Mothwurf, Graz (AT)

(73) Assignee: Grips Electronics Ges. m.b.H, Graz (AT)

( * ) Notice: Subject to any disclaimer, the term of this patent is extended or adjusted under 35 U.S.C. 154(b) by 0 days.

(21) Appl. No.: 09/267,464

(22) Filed: Mar. 12, 1999

(51) Int. Cl.[7] ..................................................... A63F 13/00

(52) U.S. Cl. ......................... 463/17; 273/138.2; 273/274; 273/309; 463/25

(58) Field of Search ............................. 273/138.1, 138.2, 273/274, 309; 463/25, 29, 17

(56) References Cited

U.S. PATENT DOCUMENTS

| | | | | |
|---|---|---|---|---|
| 4,157,139 | | 6/1979 | Bjoerk . | |
| 4,531,187 | | 7/1985 | Uhland . | |
| 4,614,342 | | 9/1986 | Takashima . | |
| 4,755,941 | | 7/1988 | Bacchi . | |
| 5,042,810 | * | 8/1991 | Williams | 273/138.2 |
| 5,078,405 | | 1/1992 | Jones . | |
| 5,651,548 | * | 7/1997 | French et al. | 273/309 |
| 5,743,798 | * | 4/1998 | Adams et al. | 463/17 |
| 5,957,776 | * | 9/1999 | Hoehne | 463/25 |

FOREIGN PATENT DOCUMENTS

| | | |
|---|---|---|
| 573 635 | 3/1976 | (CH) . |
| 3128094 A1 | 2/1983 | (DE) . |
| 3137484 A1 | 4/1983 | (DE) . |
| 3403018 A1 | 8/1985 | (DE) . |
| 3436287 A1 | 4/1986 | (DE) . |
| 3515890 A1 | 11/1986 | (DE) . |
| 3939450 A1 | 6/1991 | (DE) . |
| 4328792 C1 | 12/1994 | (DE) . |
| 4439502 C1 | 9/1995 | (DE) . |
| 0310761 | 4/1989 | (EP) . |
| 0416751 A2 | 3/1991 | (EP) . |
| 0607823 A1 | 7/1994 | (EP) . |
| 0607823 B1 | 9/1998 | (EP) . |
| WO 95/28996 | 11/1995 | (WO) . |

OTHER PUBLICATIONS

Soviet Inventions Illustrated, Section E1 (Abstracts) week 8535, London: Derwent Publications Ltd., N85 162 294, T04, T05, SU 1140 137 A (Don Gibrougleavtoma), Oct. 9, 1985.

* cited by examiner

*Primary Examiner*—Benjamin H. Layno
(74) *Attorney, Agent, or Firm*—Townsend and Townsend and Crew LLP

(57) ABSTRACT

A method for determining the total amount bet by individual players participating in multiple spins of a roulette game at a gaming table that has a chipper machine and an intelligent table terminal. The method involves interfacing the chipper sorting machine with the table terminal, allocating a chip to a patron at the terminal, counting the number of color chips sorted by the chipper machine per color, and associating the number of color chips sorted by the machine per color with the patron. The total amount bet by that patron is then determined by mathematically linking the chip value of the color chip of the patron with the number of chips of the individual color sorted by the chipper machine in the time period in which the color chip is associated with that patron.

18 Claims, 5 Drawing Sheets

PATRON AND CROUPIER ASSESSMENT IN ROULETTE

BACKGROUND OF THE INVENTION

In the past, an approximate determination of the individual patrons participating in a game of roulette has been effected by the pit supervisors/floor persons. These are employees of the casino who attempt to estimate the average bet of each patron, the number of games per hour and also the time each patron plays at the table, and thus the turnover, profit or loss of the individual casino visitors, through the observation of the progress of the gaming. Disadvantages of this method are the high costs of personnel and the inaccuracy of the determination of the turnover, profit or loss of patrons, the possibility of floor persons favoring one or more patrons but paying no attention to other patrons.

OBJECTS OF THE INVENTION

It is the object of the invention to avoid the disadvantages of the known systems and to set forth a method and an apparatus with which the determination of the turnover of individual patrons is possible in a reliable manner.

It is a further object of the invention to determine the win or loss of individual patrons.

It is a further object of the invention to enable the croupier performance to be assessed.

It is a yet further object of the invention to acquire the data required for assessing the patrons turnover and the croupier performance in a relatively simple and reliable manner which does not place an extreme burden on the croupier, but rather helps the croupier with complex win calculations.

Further objects and advantages will become apparent from the following description.

BRIEF DESCRIPTION OF THE INVENTION

Patron Bet and Number of Games

According to a first aspect of the present invention there is provided a method of estimating the total amount bet and the number of games played by an individual patron participating in a game of roulette and playing with chips of a specific nature, for example of a specific coloring or size or shape or pattern, comprising the step of counting the number of chips of that specific nature, which pass through a chipper machine associated with the game of roulette while the patron is playing.

In a preferred method of this kind for determining the total amount bet by the individual patrons participating in a plurality of spins of a roulette game at a gaming table fitted with a chipper machine and an intelligent table terminal capable of interpreting data from the chipper machine, from an electronic chip tray and from a roulette number reader, the method comprises the steps of

- interfacing the chipper machine to the table terminal
- allocating a patron a chip color at the table terminal
- counting the number of color chips sorted by the chipper machine per color
- associating the number of color chips sorted by the chipper machine per color with the patron
- and determining the total amount bet by that patron by mathematically linking the chip value of the color chip of the patron with the number of chips of the individual color sorted by the chipper machine in the time period in which the color chip is associated with that patron The invention is based on the realization that the number of chips of any particular color sorted by the chipper machine, although not actually a precise measurement of the total amount bet by the patron using that color, is nevertheless closely related to the total amount bet and can thus be used as a reliable indication of the total amount bet. The inaccuracy results from the practice of breaking stacks of chips when paying patrons their winnings, with the non-used chips being returned to the chipper machine. Since the number of chips returned in this way is statistically related to the roulette game, as will be explained later in more detail, it is readily possible to make a statistical correction to the total number of chips of any one color passing through the chipper machine in order to arrive at a total value which is a close approximation to the total amount bet by the individual patron playing with that color of chip.

Since it is possible to assess the total amount bet by each patron playing at the gaming table in this way, it is also possible to sum the total amounts bet by all patrons playing at the gaming table during the period in which a particular croupier is working at the gaming table, and thus it is possible to assess the total turnover achieved by the croupier during each working period.

Patron Win/Loss

According to a second aspect of the present invention there is provided a method of estimating the win and loss of an individual patron during his playing period on a gaming table. The concept for the win and loss capture is to capture all value movements between the patron and the table. Every buy in (drop) with bank bills or markers at the table is entered by the croupier at the table terminal and allocated to the playing position. The same applies to a partial or total pay back of a marker by a patron. The movement of value chips can be estimated by the concept of distinguishing between “play chips” and “pay chips” at the gaming-table. At roulette tables play chips are normally color chips, value chips are used as pay chips.

Whenever value chips are used as play chips for placing bets, the croupier will not handle these chips in and out of the chip tray but rather store them in stacks of twenty like he does with color chips and will handle them the same way as color chips so that they do not hit the chip tray with every spin, i.e. do not change the value of the chips in the chip tray.

Whenever a pay (value-) chip movement is detected by the chip tray, which is equipped with a system for detecting the instantaneous value of the chips on the chip tray, and thus also the change in value of the chip tray for any pay in or pay out, the table terminal prompts a screen asking to croupier to enter the playing position to which the pay chip movement belongs. The monitoring of movements of pay chips into and out of the chip tray together with the capture of all buy ins (drops) and the repayment of markers thus allows the capture of the win/loss per patron. The win loss is the patrons net buy in (drop minus repayment of markers) plus the balance of the pay chips spent and received.

Croupier Assessment

According to a further aspect of the present invention, there is provided a method of estimating the performance of a croupier at a roulette table, comprising the steps of summing, for each period the croupier is working at the roulette table, the various figures captured during each working period.

The performance figures per virtue are combined into a croupier score with a breakdown of individual scores per segment. Data are captured from every dealer work period of in average 45 minutes a dealer works at a table between breaks.

Croupier financial result—win/loss, turnover, win percentage, drop

Croupier working speed—number of spins corrected for active player positions and chips placed by patrons Croupier attracting patrons—number of positions active: average, increasing/decreasing during work period Croupier encouraging play—average bet (relative to table minimum): average, increasing/decreasing during work period In order to compensate for the influence of the time of the day the performance indicators "croupier attracting patrons" and "croupier encouraging play" are relative to all other croupiers on tables at the same time.

The financial result is derived from the total amount bet by each of the patrons participating in the game of roulette during each working period, or during a fraction of that period, wherein the individual patrons play using chips having different colors, the respective colors being associated with each said individual patron, and wherein a chipper machine is provided for receiving chips collected by a croupier during the game of roulette and for arranging the chips according to their color in respective columns, from which the croupier can take stacks of a predetermined number of chips of a respective color, each chip of a particular color having an associated monetary value, the method comprising the steps of counting the total number of chips of each color passing through the chipper machine during the period each individual patron is present at said gaming table, and establishing the total monetary value of the chips of each color passing through the chipper machine.

The above information is of great interest to a casino. For example "Frequent Player Programs" are based on the theoretical casino advantage derived from the patron's bet. Alternatively, if a patron has suffered a significant loss, then the casino is interested in retaining the patron as a customer and may choose to give him a gratuity in some form as a consolation prize.

On the hand, should a patron consistently make substantial wins at a roulette table, then there is always the suspicion that the patron is participating in an unfair practice and the casino is alerted to observe a particular patron carefully.

The casino is also interested in monitoring the performance of the croupier. For example, the number of spins of the roulette wheel per working period and/or the total numbers of chips sorted by the chipper machine during each working period of a croupier is one useful indication of a croupier's performance.

The ability to determine the amount of win or loss achieved by a croupier in each working period is of significant importance to a casino to determine if the croupier is within the statistical pay-out percentage limits over a period of time.

It is known from a statistical analysis of the game of roulette, that there is a built-in house advantage which amounts to 2.7% in the case of French roulette, or 5.4% in the case of American roulette. That is to say, the average win of the casino is 2.7% of the total turnover in the case of French roulette and 5.4% in the case of American roulette. Thus a good croupier can be expected to achieve a net profit for the casino close to 2.7% for French roulette, or close to 5.4% for American roulette. If a croupier consistently achieves a lower return for the casino then there is always the suspicion that he is either not up to the job or is involved in some unfair practice, such as paying incorrect amounts to the patrons when the patrons have won, or so-called section spinning in which the croupier is able to preferentially place the roulette ball in a certain segment of numbers and pockets and thus to benefit patrons to whose attention he has directed this possibility.

The present invention provides the key to monitoring both the total turnover of the croupier and also the win or loss of the croupier and thus, the average percentage win achieved by the croupier.

However, it is not a simple matter to determine precisely the win or loss achieved by the croupier. While this might theoretically be possible by observing every spin of the wheel correctly and by full assessment of every move on the gaming table, the complications that arise would in practice at least slow down the game to such an extent that it would be less profitable, and probably also less interesting for the players. By way of example it is usual for croupiers to work for a working period of 45 minutes and to then take a 15 minute break. Whenever a croupier goes for a break another croupier will take over the running of the table. It would be highly unlikely that the amount of money on the table, i.e. the chips held by the individual patrons, is the same when the croupier starts work as at the end of his working period. Thus, the number of chips held by the patrons represents an imponderable value which prevents an accurate assessment of the win or loss achieved by the croupier during each working period. Nevertheless, the present invention recognizes that a good approximation to the total win or loss achieved by a croupier in each working period can be achieved by forming the sum of the total pay-ins by the patrons during that working period and by the change in value of the chip tray. By observing this win or loss over a fair number of working periods, for example a month, it is possible to obtain a statistically reliable assessment of the average win or loss achieved by the croupier as will later be explained in more detail.

As mentioned above, one unfair practice sometimes encountered is for a croupier to be practicing section spinning. The present invention also makes it possible to determine whether a croupier is practicing section spinning by measuring, for a plurality of spins of a roulette wheel, one or more of the following parameters and finding out if these parameters have the normal variance of the average croupier or if this croupier is spinning the wheel and ball in an over consistent pattern:

the initial speed of the ball in the rim of the roulette wheel, the speed of rotation of the moving roulette wheel when the ball is initially launched into it, and the relative position of the roulette wheel to the ball and to the segment of the casing in which the ball falls and by mathematically determining whether the estimation of values of the measured parameter corresponds to an expected statistical distinction or shows that a suspicious correlation exists between these values.

Furthermore, the casino management is also able, from the statistics made available by use of the present invention, to determine whether, during a period of high correlation of the said values with one croupier, one or more patrons at the gaming table enjoys with that croupier wins which are significantly higher statistically than the casino advantage for the roulette game being played.

Accordingly, it can be seen from the foregoing that the present invention provides the casino management with a variety of tools for assessing the performance of a croupier and the progress of the game of roulette at a gaming table despite the inability to precisely measure each of the factors of interest.

Further advantages and benefits of the invention will be apparent from the further claims. Moreover, the apparatus claims describe preferred apparatus for carrying out the methods described above.

BRIEF DESCRIPTION OF THE DRAWINGS

The invention will now be described in more detail with reference to a preferred embodiment and to the accompanying drawings in which are shown.

DESCRIPTION OF THE PREFERRED EMBODIMENT

Figure 1:
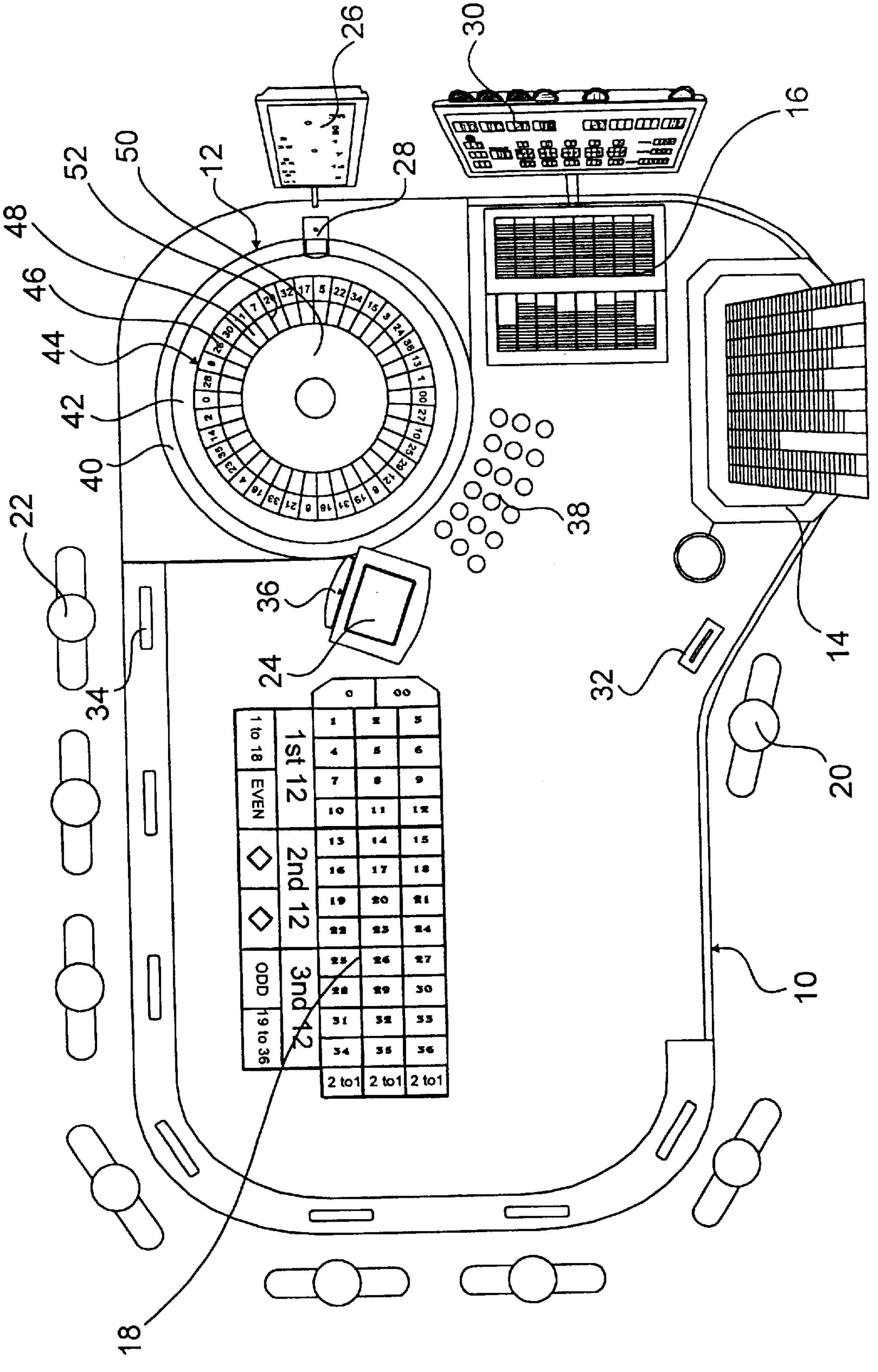
FIG. 1 a schematic plan view of a gaming table equipped for the game of roulette, FIG. 2 a schematic diagram illustrating the interfacing of the various items of the roulette table of FIG. 1, FIG. 3 a possible screen drawing for the selection of color chips for each of the patrons, FIG. 4 a possible screen drawing illustrating the so-called drop amount, FIG. 5 a possible screen drawing for the association of the chip value with the color chip, FIG. 6 a preferred screen layout of the win calculator on the table terminal, FIG. 7 a representation of the chip value and payout display, and FIG. 8 a table illustrating a croupier's performance measured over a period of twenty-eight working days.

FIG. 1 shows a roulette table 10 equipped with a variety of electronic modules for the collection and assessment of data concerning the patrons and the croupier.

The roulette table 10 is equipped in the usual way with a roulette wheel generally indicated at 12, a chip sorting machine 14 for sorting color chips (and value chips with newer chipping machine versions), hereinafter referred to as a chipper machine, a chip tray 16 for storing so-called value chips, and a bet placement field 18 where patrons can place their individual bets. In this example the bet placement field is configured for American roulette in as much as it has two zeros (identified in FIG. 1 as 0 and 00, in contrast to French and English roulette which has only a single 0. The roulette wheel 12 is also configured in this case for American roulette which means that the number ring will have the numbers 0 and 00 in addition to the numbers 1 through 36 as shown.

During the game of roulette, the croupier will normally occupy the position identified by 20 and the patrons or players will be arranged around the table as indicated by the reference numerals 22.

In order to practice the present invention in all its ramifications the roulette table is equipped with further items, namely a table terminal 24, a roulette number display 26, an automatic number detection system 28, a chip value and payout display 30, a drop slot 32, and optionally player stations 34. The automatic number detection system 28 can be designed in the manner described in international patent application PCT/EP95/00933 as published in the international patent publication no. WO 95/28996.

The automatic number detection system makes it possible to detect which pocket the roulette ball has dropped into and this is displayed on the roulette number display 26. The automatic number detection system 28 also has other functions which will be explained later in further detail.

The chip tray 16 is designed in the same way as the chip tray described in U.S. Pat. No. 5,755,618 and is thus designed to provide an electronic output of the total value of chips stored in the chip tray and to automatically register any changes in the value of the chip tray. In addition the chip tray 16 is coupled to the chip value and payout display 30 via the table terminal 24 which will be described later in further detail with reference to FIG. 7, particularly since this is an optional unit.

The table terminal 24 is configured in the preferred embodiment as a graphical screen with touch-sensitive data entry at the screen. Such screens are known per se, for example in connection with automatic cash dispensing machines. Associated with the table terminal is a card swipe 36, which permits the croupier 20 to draw or swipe an identification card of a player through the card swipe. This enables information on the card, for example relating to the identity of the player, to be entered into the central data processing unit (computer) 64 associated with the gaming table, as will later be explained with reference to FIG. 2. Should the table be equipped with the optional player stations 34 comprising a patron card reader, a display and some optional entry buttons, then these can also be used for the player to enter a card and register himself at the table. That is to say, the player stations 34, if provided, are also coupled to the computer 64 via the table terminal 24.

Finally, FIG. 1 shows a plurality of stacks 38 of color chips arrayed in front of the croupier 20 around part of the periphery of the roulette wheel 12.

Although well known to those skilled in the art, a brief description will now be given of the usual method of playing the game of roulette, in order to facilitate an understanding of the present invention.

For the sake of simplicity, we assume the casino has just opened for play, the croupier 20 is present at his position, and various players 22 have arranged themselves around the roulette table. It is usual for each player to play the game of roulette with a different color chip uniquely associated with him, so that winning and losing bets can easily be identified.

It is also usual for a minimum bet to be associated with a roulette table, i.e. the minimum amount which can be bet, which may, for example, start with $5 or more. That is to say, the minimum value which each chip can have is, say, $5. However, certain players may wish to play with higher stakes. Provision is thus made for higher values to be associated with the color chips of those players 22 wishing to play for higher stakes. In order to make sure that all players are aware of the value of each chip on the table, a sample chip of each color is normally hung on a rack, with the monetary value of the chip being associated with a value indicator in the rack.

When the game first starts, it is first necessary for each player 22 to acquire a supply of chips for use during the progress of the game. There are several ways that this can be done. First of all, it is possible for the player to pass money to the croupier, who then places the money in the drop slot 32 and passes the corresponding number of color chips to the player. For this purpose the croupier would normally take a number of stacks from those arrayed in front of him, in each case in the color associated with the respective player. It is a convention that each of the stacks 38 contain 20 chips.

Another possibility is for the individual players 22 to approach the table with value chips, normally of higher denominations. These are chips issued by the casino, which can be used at a variety of gaming tables in the casino and are handed to the player, for example in exchange for smaller denomination value chips he has accumulated at a table. Such value chips are placed by the croupier in the chip tray. Again the player will be given color chips to the value of the value chips passed by him to the croupier, or he will be given value chips of the denomination of his choice.

Another possibility is for the player to request a so-called marker at the table. A marker is effectively a casino check for a certain sum of money. Again, the marker will be entered at the table terminal and the croupier will give the player chips to the value of the marker.

Another possibility is for the player to play with value chips. In times of heavy play, some casinos allow multiple players to use the same denominations, in which case the identification of the player by the type of value chip, is lost which can lead to disputes.

Finally, some jurisdictions such as Nevada permit players to play with normal money—money play. A patron may place a bet by placing bank bill(s). The dealer will indicate this fact to the supervisor by saying “money play”. In case the patron wins the dealer will place the win in the form of value chips and the patron will take the bills and the value chips or he will leave part of the chips at the table as the next bet, if the bet is lost the dealer will drop the money and enter the amount as “money play drop” into the table terminal and should the patron have signed onto a box already the amount will be assigned to that position.

Once all the players have acquired a supply of chips, the game may start. As is well known, the conventional roulette wheel 12 comprises an annular casing 40 containing a static, inwardly sloping rim 42, within which there is mounted a rotatable cylinder 44. This cylinder 44 has an outer ring of numbers 46 corresponding to the numbers of the bet placement area 18, and an inner ring of pockets 48, which, in the same way as the outer numbers ring, is arranged concentrically to the cylinder. Each of the individual pockets 48 is associated with one of the numbers on the numbers ring and is isolated from its neighboring pockets by vertically and radially disposed separators 50. Inside the ring of pockets 48, there is a central dome area 52.

In use, the cylinder 44 is spun in the one or other direction and then a ball is projected by the croupier to run around the rim inside the annular casing 40. The croupier will spin the ball in the opposite direction of rotation of the cylinder, The ball will gradually slow down. The centrifugal force keeping it within the rim 42 of the wheel 12 will reduce in magnitude, so that the ball gradually falls down the rim and passes over the numbers ring 46, where it may bounce off one or more of the separators 50 or off the dome before eventually landing in one of the pockets 48, which is the winning pocket, i.e. the winning number.

The players 22 are able to place their bets on the bet placement area 18 until the ball spinning in the rim 42 has slowed down so that it leaves the rim 42. For those not familiar with the game of roulette, it should be noted that it is usual for a player to use several chips, and indeed to make several bets for each spin of the roulette wheel.

If a single chip is placed on a single number, then the chance of that number becoming a winning number is 1:38. This follows from the fact that in American roulette, there are a total of 38 numbers on the number ring, namely the numbers zero and double zero and the numbers 1 to 36, and 38 pockets associated with them (one pocket for each number).

If a player places a single chip on a single number and loses, then the chip is scooped by the croupier into a chute 54 associated with the chipper machine. If, however, the number selected by the player comes up, then he is given 35 chips by the croupier in addition to recovering the one chip stake he originally played.

If the player places, say, 4 chips on the single number and the number wins, then he will be given 4×35=140, chips by the croupier.

Another possibility is for the player to place a chip so that it straddles two numbers. In this case the chance of winning is 1:17. If the player wins, on either of these numbers, he is given 17 chips by the croupier for each chip placed by him.

It is also possible for a player to place a chip so that it lies on four numbers. In this case his chance of winning is increased, but the returns if he does win are also reduced, and in fact for each chip placed in such a way he will receive eight further chips from the croupier and will also have his stake returned to him.

It is also possible for a player to place a bet on five numbers, for example on the numbers 0, 00, 1, 2 and 3. In this case his chances of winning are again increased. However, if he does win, the number of chips he receives from the croupier is reduced to six for each chip he has bet in this way.

Another possibility is for the player to place a chip on three numbers. In this case he receives 11 chips from the croupier for each chip bet. A further possibility is for him to place a bet on six numbers. In this case he receives five chips from the croupier for every one he has bet. Yet another possibility is for the player to bet on columns of twelve numbers. In this case the chance of him winning is much higher, but if he does win, his win is reduced to two chips for each chip bet in this way.

It is also possible for a bet to be placed on twelve numbers chosen other than in columns, for example on the top three by four array of the numbers 1 to 12, on the middle three by four array of the numbers 13 to 24, or on the bottom three by four array of the numbers 25 to 36. Again, the chance of winning is high, but the returns for a win are low; the croupier will only pay the player two chips for every one bet.

Another form of bet is possible referred to as a “chance simple”, and involves a bet placed on any one of the number of so-called “chances”, referred to as “rouge”, “noir”, “pair”, “impair”, “manque”, “passe”. For example “rouge” signifies that the player bets simply on the color red. In this case the chance of winning is high, but if the player wins, he only receives one chip from the croupier, in addition to the chip he originally bet.

Every bet which is not a winning bet is collected by the croupier, the color and/or value chips are placed in the entrance to the chute leading to the chipper machine 14. The chips are then sorted by the chipper machine according to their color and/or value arranged in stacks within the chipper machine, from which the croupier can take stacks of twenty chips each to replace those on the table that he has used up. At this stage it should be noted that when paying a player for a winning bet, the croupier will take a whole number of stacks present on the table, will break one of the stacks and will put the chips not owed to the player back into the chute of the chipper machine.

For example, if the player has bet two chips on a single number and won, then the croupier must pay him 70 chips of the same color. To do this, he will take four stacks of 20 chips each, totaling 80 chips, will pass three full stacks to the player and will break the fourth stack so that the player receives 10 chips. The remaining ten chips are placed in the chute associated with the chipper machine.

Further examples of this will be given later.

Having described the usual way of playing the game of roulette, a description will now be given of how the various items of equipment present at the roulette table are linked together in accordance with the present invention and what significance this has to the assessment of data.

Figure 2:
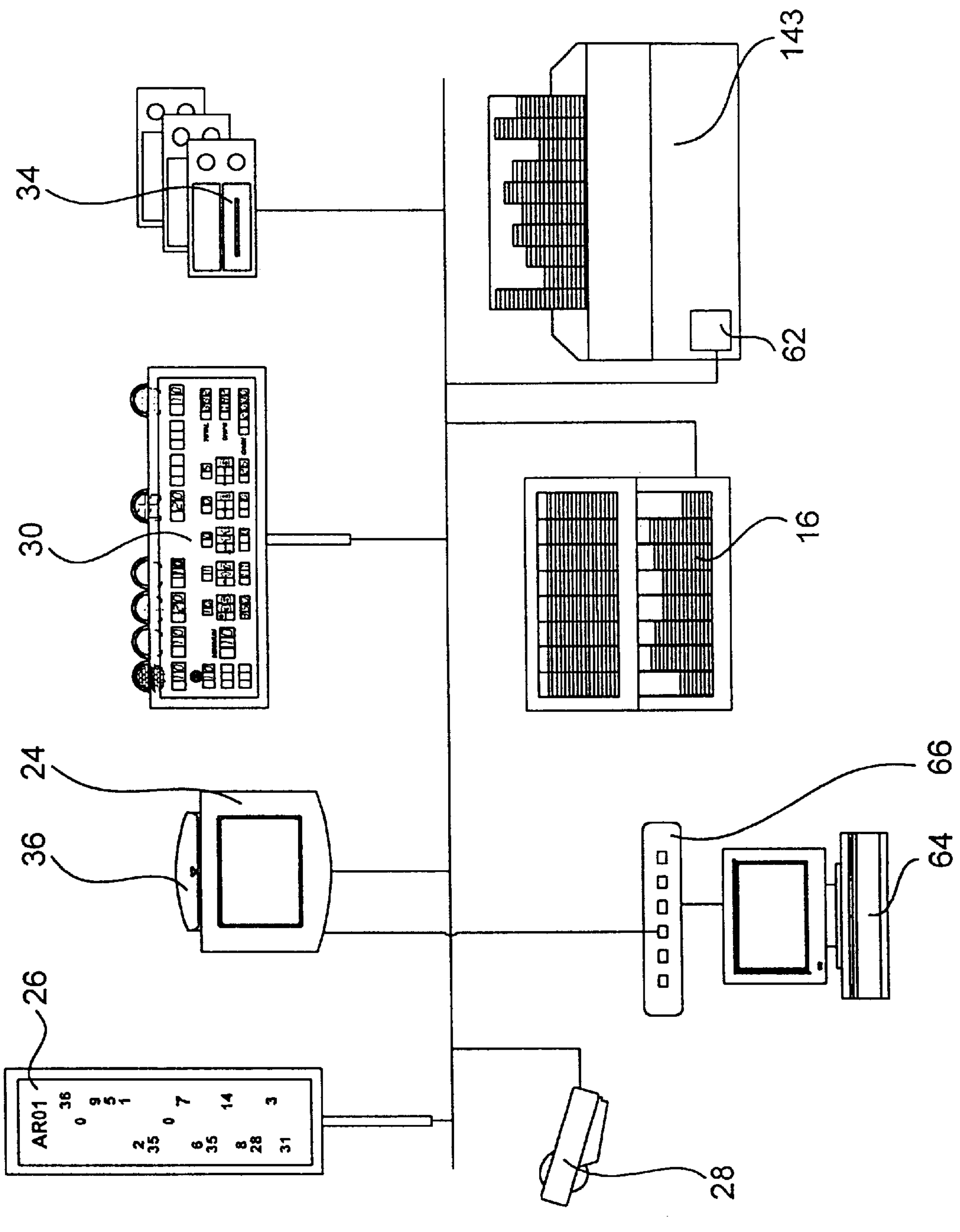

Referring now to FIG. 2, there can be seen the same items of equipment that are shown in FIG. 1, but also the way they are interconnected electronically. The same numbers will be used in FIG. 2 to identify the same items, as are identified by them in FIG. 1.

FIG. 2 shows in addition the table communication bus 60, to which all the items of FIG. 1 having an electronic interface are connected. Thus, the interface 62 links the chipper machine 14 to the table communication bus 60. The card reader 36 is associated with the table terminal 24, which is connected to the table communication bus 60. Equally, the roulette number display 26, the electronic chip tray 16, the automatic number detection system 28, the chip value and payout display 30 and the player stations 34 are connected to the table communication bus 60 via suitable interfaces (not shown). A central data processing unit 64 is coupled to the table terminal and to the table communication bus via one or a plurality of Ethernet hubs or switches 66, which distribute the Ethernet network from the central data processing unit 64 to the table terminals 24 of a plurality of gaming tables in the casino.

FIGS. 3, 4, 5 and 6 show sample screens, which appear on the table terminal 24 in the preferred embodiment when this table terminal is realized, in the preferred embodiment, as a graphical screen with touch sensitive data entry.

As indicated above, when a player first comes to the table, he will give the croupier either cash or value chips or request a marker and will tell the croupier of the value with which he wishes to play. He will also give the croupier his player identification card, which the croupier will draw or swipe through the card reader 36 at the table terminal 24. This action will lead to the drawing of FIG. 3 appearing on the screen of the table terminal. The croupier will select a color chip 70, or possibly a value chip 72, if color chips are not available or if the player wishes to play with value chips. If a color chip is selected, then the table terminal will next show the screen drawing of FIG. 5, which enables the croupier to touch the screen, so that the desired value is associated with the color chip. It can be seen from FIG. 3 that the third color chip of the top row has been selected. In practice this is shown by the selected color chip lighting up brightly; in the drawing the selected color chip is indicated by representing the value of the chip as an outline rather than as a solid number. It can be seen from the drawing of FIG. 5 that color chips at this table can have the value $5, $10, $20, or $50, as indicated in field 82, with the table minimum being $5, as indicated in field 84, and with the actual chip value selected in the case under discussion being $10, as indicated in field 86. The field 88 indicates the chip color as selected on the screen of FIG. 3. Once the chip color and the chip value have been fixed, the screen drawing of FIG. 4 appears, and the croupier can type in the amount of the drop by the respective player, for example the screen has a three by three matrix of fields 90 providing for drops of 10, 20, 50, 100, 200, 500, 1000, 2000 or 5000 dollars, and the precise amount of the drop by the individual player can be recorded by touching the screen at the appropriate field. In the present example, the player has made a drop of $400, and this is achieved by pressing the field 200 twice, so that the drop amount of $400 appears in the field 92. Beneath the three by three matrix 90, there are two further fields, namely 94 and 96 respectively labeled "cancel" and "enter". Once the croupier has dealt in the drop amount of 400 and it has appeared in the field 92, he can then press the "enter" area of the screen to enter this value of the drop into the computer system. Should he have made a mistake, then he can press the "cancel" area 94. This then cancels the sum appearing in the drop field 92 and enables the croupier to type in the new value as appropriate in the three by three matrix field 90.

Figure 3:
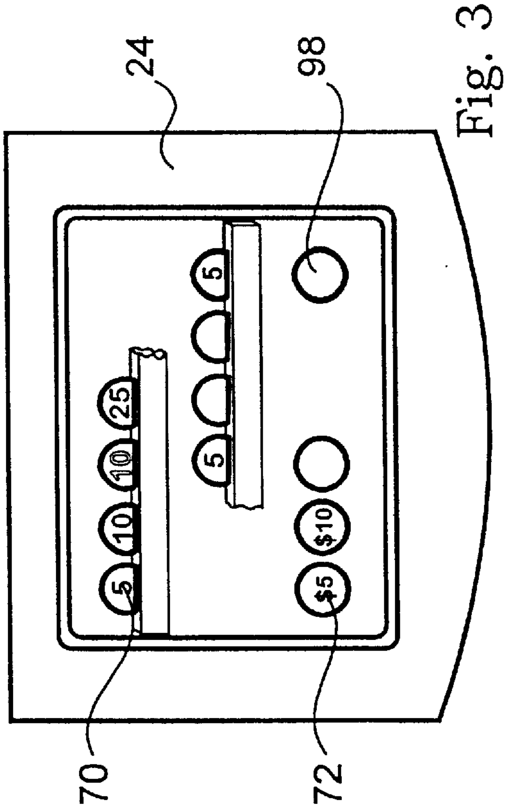
Figure 4:
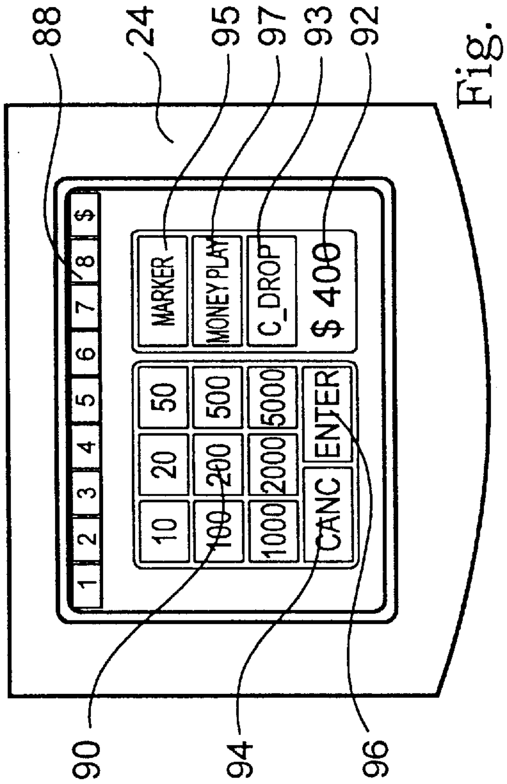

If, during the course of a game, a player or patron wishes to buy further chips, then the croupier will either select the screen drawing of FIG. 3, which can, for example, be done by pressing the corresponding color chip field 70 or value chip field 72 relating to the specific color/value appropriate for that player. Alternatively, he can once again swipe the player's player card through the card reader, so that the screen drawing of FIG. 4 appears. He can then enter the drop amount there as previously described. It will be noted that the first time the player's card is swiped through the card reader, the screen of FIG. 3 appears. The next time the same card is swiped through the card reader, the screen of FIG. 4 will appear. This will also occur for any subsequent drops by the patron during the same gaming period, i.e. until the patron leaves the table and is signed off by the croupier.

Figure 5:
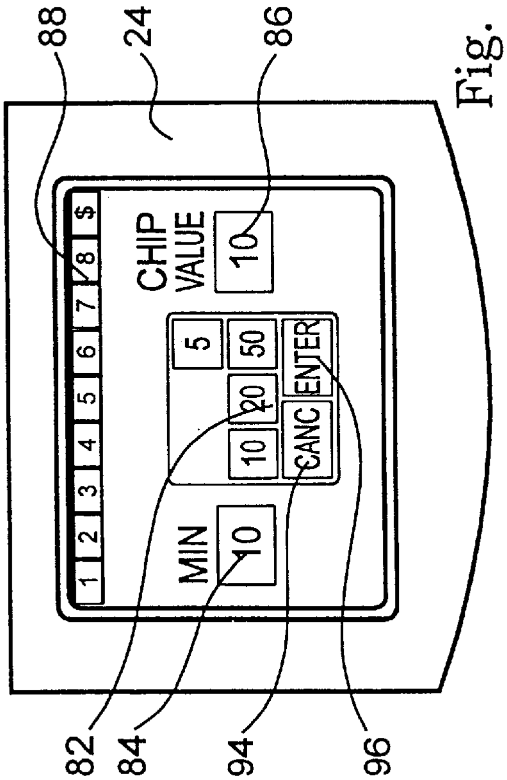

Through these various actions, the computer system learns the identity of the player, from the player identity card, is able to associate the color and the value of the chip associated with the player by the entries made by the croupier using the screens of the FIGS. 3 and 5, and is able to record the amount of any drop by the player. It should be noted that the method of making the drop, be it by cash, money play or by marker, as selected by the fields 93, 95 or 97 is irrelevant. In each case the croupier simply enters the relevant amount using the screen drawing of FIG. 4.

In the case of value chips, it is possible for the croupier to add these directly to the chip tray. The change in value in the chip tray is then associated with the drop by the player through the time association of the input of the player's identity card and the change in value of the chip tray 16. In this case the table terminal will indicate the inventory change of the chip tray as default drop to the croupier. Otherwise the input is then made manually by the croupier as explained above.

Figure 7:
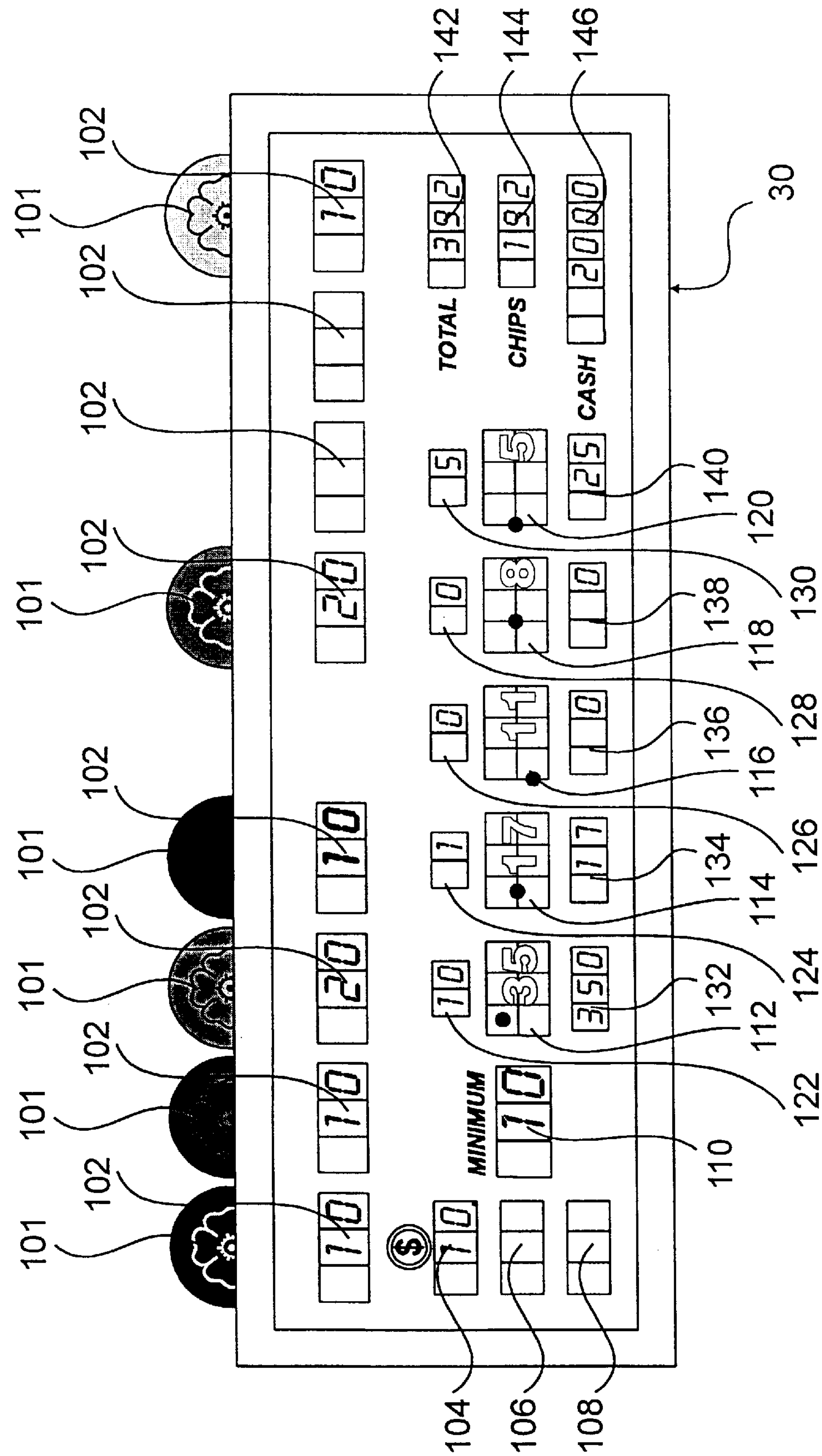
Figure 8:
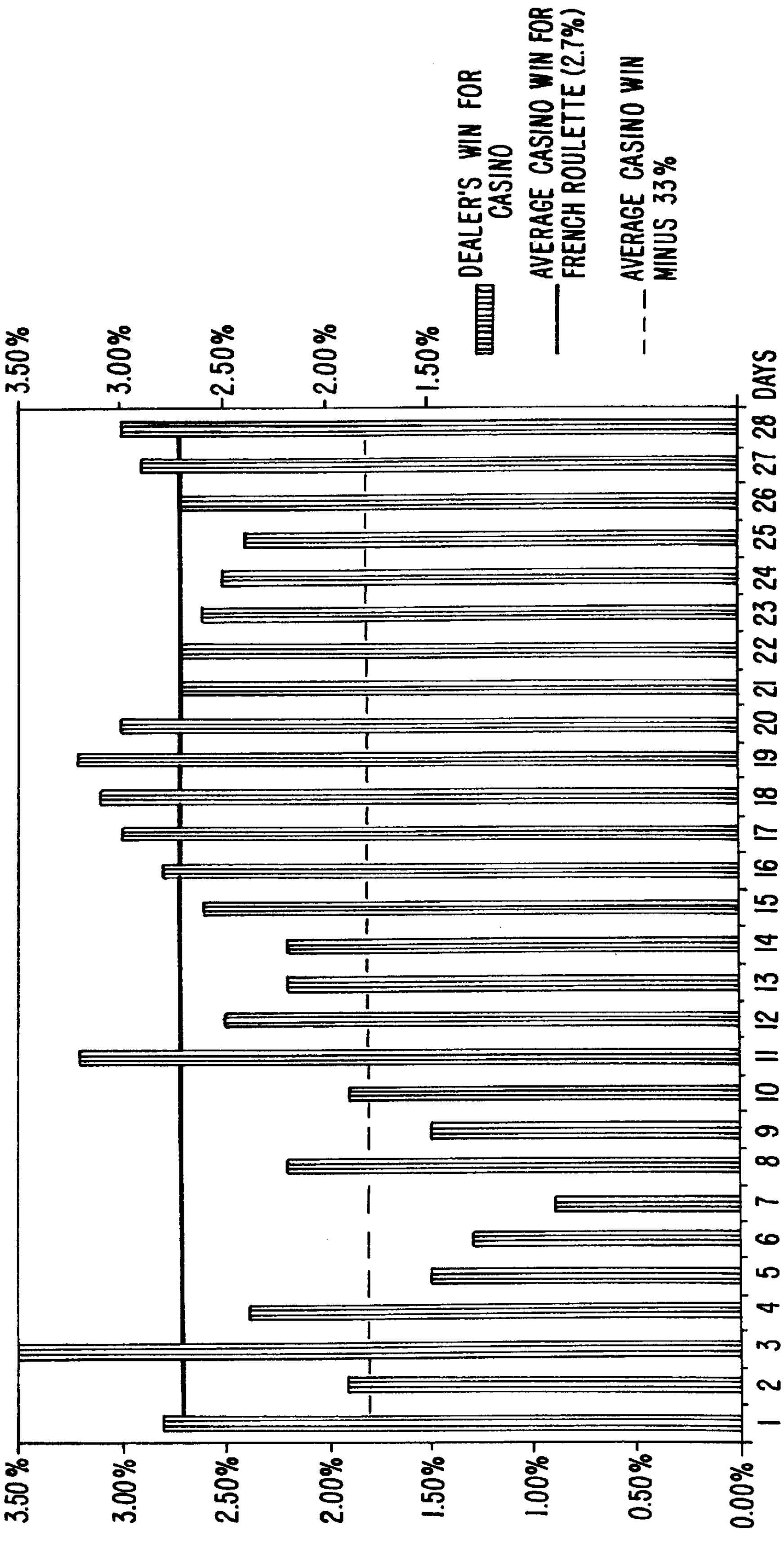

Turning now to FIG. 7, there can be seen the details of a chip value and payout display 30. Arranged along the top of the display are sample color chips 101 in each of the different colors available at the table. Beneath each chip there is a rectangular field 102 containing a number which is the amount in dollars associated with the chip immediately above the respective field. Beneath the left-hand field 102 there are three further fields 104, 106, 108, which show the denominations of value chips that are used for betting. In the present case, only one value chip is being played and has the value of $10. The table minimum bet is shown in the field 110 and the row of fields 112, 114, 116, 118 and 120 show the payment indicators for winning combinations of a particular patron. Moreover, the black dot shown in each of the fields 112, 114, 116, 118 and 120 indicates where a chip must be placed by a patron in order to achieve a particular win. Thus, the field 112 shows the case of one chip on a single number, for which the croupier must pay the patron 35 chips. The field 114 shows a winning chip bridging two fields, for which the croupier has to pay the patron 17 chips. In similar fashion, the fields 116, 118 and 120 show other usual payouts which have to be made by the croupier.

The row of fields 122, 124, 126, 128, 130 positioned above the row of fields 112, 114, 116, 118 and 120 show the number of chips bet by the particular patron for each of the possibilities shown in the respectively associated field 112 to 120 or beneath it. The bottom row of fields 132, 134, 136, 138, 140 show the total number of chips won by the patron. Thus, the particular play shown in the diagram of FIG. 7 is a play of ten chips (box 122) on a single number (box 112) which is won, thus the croupier has to pay 10×35=350 chips (box 132) to the particular patron for this part of his total bet. In addition, the patron has placed one chip (box 124) on two numbers resulting in a win of 17 chips. The player has made no bets (boxes 126, 128) of the kinds shown in boxes 116 and 118. Accordingly, he has won no chips, as shown in boxes 136 and 138. However, the patron has bet five chips (box 130) in the manner shown in box 120, and thus wins a total of 5×5=25 chips (box 140) for this bet. The patron to whom this bet relates is the patron associated with the fourth color chip 101 from the left in FIG. 7, with a value of $10 per chip. This is emphasized on the display of FIG. 7 by a brighter lighting of the respective field 102.

Thus, the player associated with this chip has won a total of 392 chips, as indicated in the "total" box 142, and the chip display now makes a proposal to the croupier for the manner of payment of the player. In this case the suggestion is that the player should receive 192 chips (box 144) and a cash amount of $2000 (box 146), which may, of course, be paid by value chips or by the return of a marker or a reduction of the marker amount.

The reason for paying a win in this way is simply that there are only a limited number of color chips which can be accommodated conveniently on a roulette table, typically between 300 and 400 chips of each color.

It should be noted that the payment display of FIG. 7 is an optional feature which can readily be realized using the present invention, and which is intended to facilitate the work of the croupier in calculating the wins from complicated bets, such as those shown above. If the win is more straightforward, for example 1:2 or 1:1, then the croupier will invariably be able to handle such a bet without the aid of the "win computer" embodied in the chip value and payout display 30.

The values shown on the chip value and payout display 30 must, of course, first be entered at the table terminal. This will typically be done by the croupier calling up a win calculator screen on the table terminal 24 and typing in the corresponding values by touching the screen the appropriate number of times.

Figure 6:
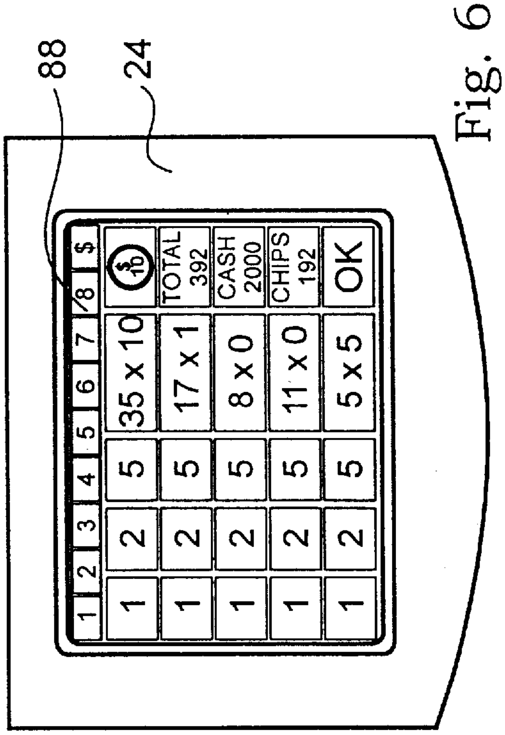

For this purpose it is most convenient if the table terminal has a touch-type graphic screen which can be called up by pressing the corresponding color chip field 70 or value chip field 72 relating to the specific color/vlue appropriate for that player, which will bring up a pop-down menu from which the croupier can select the win calculator and which corresponds to the layout of the chip value and payout display 30. FIG. 6 shows a preferred screen layout of the win calculator on the table terminal. The display makes it easy for the players to check that the croupier is behaving fairly and also enhances the atmosphere at the roulette table associated with a good win.

The chipper machine, which is known per se, for example from U.S. Pat. No. 4,157,139, has the function of sorting chips of a particular color into particular columns. For this it is provided with sensors for recognizing the different types of chip. The output signals from the sensors are used to steer gates, through which the chips are fed into the individual columns, usually using solenoid operated plungers to push the chips into the respective columns. Modern chipper machines are also able to sort value chips and, in order to avoid too many columns, will sort several denominations into one column but will still individually count the chips per denomination. Modern chipper machines provide a communication port via which the interface 62 can interrogate the internal meters of the chipper machine for the number of sorted chips. For older machines, the interface 62 requires tapping of the solenoids driving the plungers and a clock signal active for every chip sorted. The information is then sent to the computer system 64.

On first using the chipper machine, the sequence of the chips in the chipper machine is first specified in the programming/learn mode of the chipper machine. This normally takes place by throwing the chips into the chipper machine in the desired sequence, in which the chips are to be output in the columns of the chip sorting machine. This would normally be the same sequence as is shown in the display of FIG. 7.

The interface 62 (FIG. 2) transmits the sum of the sorted chips as n-position values in blocks of numbers in the sequence in which the chips are pushed out into the columns of the chipper machine. At the table terminal 24, the chips are also shown, in the diagram of FIG. 3, in the order in which they are fed into the chipper machine. In this way the action of the chipper machine, the display of the table terminal of FIG. 3 and the output display of FIG. 7 are coordinated with one another, i.e. the sequence of the color chips is the same in all of them.

Having described the various items of hardware and electronic equipment at the table, a description will now be given of the various assessments that can be made with this equipment.

A description will now be given of the various pieces of information which the apparatus and method of the invention can deliver.

a) Patron Win/Loss

As indicated above, roulette is played with color chips, with each patron receiving chips in his individually allotted color. Some casinos allow additionally the use of value chips, in which case only one patron per chip value is allowed in order for it to be possible to associate each value chip uniquely with an individual patron. Casinos do allow more than one patron per value chip denomination in which case patron can only be rated by the floor person by the classic manual method. It is mandatory for each table to have differently patterned color chips in order to avoid different values of the same color chip in a casino. Actually, the word "color" is misleading, since the chips usually have different surface decorations and a plurality of different colors in order to make it possible to distinguish readily between them.

Also as indicated above, when a patron arrives at a table, he buys color chips at the table minimum or higher value in exchange for cash, value chips or markers. Markers are casino cheques by which the patron can draw from his credit or cash deposit account with the casino. Markers are generally issued by pit clerks and signed by the patron.

Also as explained previously, the patron is identified by swiping his player identification card through a card reader. Then the screen display of FIG. 3 appears, which enables the croupier to associate a particular color chip or a particular value chip with that player with a minimum of effort. It should be noted here that the player need not necessarily have an identity card in which case an anonymous player identity is created and linked to the player position. Provision is made for the floor person to enter/retrieve information concerning the identity of the player at a pit terminal (not shown in the drawings) associated with the computer system 64. It should also be noted that the identity of the patron may be his full name and address, but may also simply be a piece of information uniquely identifying him, such as his position at the gaming table, or his room number if he is staying in a hotel associated with the casino.

Following the entry of the identity of the player, and the selection of a chip using the touch screen display of FIG. 3, the touch screen diagram of FIG. 5 appears. The croupier can enter the value of the chip which is associated with the player in question. In the example of FIG. 5 the table minimum is $5 per chip and the player has elected to play with the chip value of $10 per chip. After this entry, the computer knows that player X is playing with chips of a particular color and that each chip has a value of $10. After allotting the chip value of $10, the screen drawing of FIG. 4 automatically appears. The croupier can use the touch screen to enter the drop amount by the player X—in the example of FIG. 4, $400. Thus, the computer now knows the player's identity, the color of chip he is playing with, the value associated with each color chip and the amount he has initially paid in.

Once this has been completed, the croupier passes color chips of the selected color to the player X to the value of $400, i.e. 40 chips. He does this by taking two of the stacks 38 on the roulette table 10. The same procedure is followed for all other players at the table. Thereafter, the game commences. Each time the player loses, the color chips he has placed on the table are scooped into the inlet chute of the chipper machine 14 and are automatically sorted by the chipper machine 14. Each time he wins, he is given chips by the croupier.

Each patron may need to buy further chips in the course of the game if he wishes to continue playing at the table. If this occurs, the croupier either selects the screen drawing of FIG. 3, and then the chip of the patron on the screen, or he once again swipes the player's card through the card reader. In both cases the screen drawing of FIG. 4 automatically appears for him to enter the new drop amount. The total of the drop amounts made by a patron during a period at the gaming table is summed by the computer 64 and stored in a memory associated with the computer 64.

If the player wins, then his wins would normally be paid in color chips, provided sufficient color chips are still available on the table. If this is not the case, then the balance of a win can be paid to the player in value chips. When the patron wants to leave at this stage, the croupier will pay the win in value chips, should he use the win calculator or the table terminal he will set the amount of color chips on the screen FIG. 6 to zero so that the win can be paid in value chips and preferably done using the facility of the payout display of FIG. 7. The screen FIG. 6 allows the entry of play chips the patron may hand to the croupier at this time. If the croupier does not use the win calculator the change in the chip tray inventory will trigger the table terminal to present a screen asking for the player position the amount of value chips was paid to.

When the patron leaves the table, various situations are possible. The patron may have lost all his chips and is simply walking away. In this case, the croupier will log off the patron at the table terminal, or at the table terminal, if provided, thus freeing the color chip for another patron.

The patron may have had a superb win and will indicated that he wants all his win paid in value chips. In this case the number of value chips required is taken from the chip tray and passed to the player in the same manner that occurs when the player has to be paid with value chips during the course of a game, and thus this payment to the player, a win by the player, is recorded by the computer in the way described previously. If necessary, the win calculator function can be used to determine the amount to be paid in value chips. The patron may hand his remaining color chips to the croupier, in which case the croupier will enter the number of color chips at the table terminal as a "walk" amount.

The patron may just want to leave without a high win after a particular spin of the roulette wheel. In this case the croupier will enter the number of color chips received. Should the croupier, however, just take the value chips from the chip tray and hand them to the patron, the system will automatically determine a decrease of the chip tray inventory, will flip up the payout screen to enter the walk amount of value chips at the table terminal and alert the croupier by light and/or sound to enter information concerning the patron, and/or his position at the table, and/or color of color chip.

b) Total Amount Bet by a Patron

It will be appreciated that the total amount paid in by the patron is not the same thing as the total amount bet. During the play at the roulette table, the patron will sometimes lose and sometimes win. Thus, the number of chips he has purchased will pass to and fro between him and the croupier. The total amount bet by the player will increase accordingly.

In accordance with the present teaching, this total amount bet is detected by detecting the number of chips of the particular color sorted by the chipper machine.

As explained previously, when a player wins, the croupier will take a number of stacks of chips, pass the patron a certain number of whole stacks and a broken stack and will return the extra chips from the broken stack into the chipper machine. This actually means that the chipper machine sorts rather more chips than the player has actually bet.

In order to make this clearer, two different examples will now be given. These examples allow an estimation of the discrepancy or error in assuming that the total number of chips sorted by the chipper machine corresponds to the total amount bet by the player. The two examples will reflect different house rules of the casino.

Each of the two examples lists the most frequent winning combinations encountered when playing the game of roulette, which are also the most frequent combinations selected by the players.

EXAMPLE 1

| Winning chips | Win in number of chips paid to player | No. of chipstacks (20 chips each) stacks | chips | Chips cut into chipper machine |
|---|---|---|---|---|
| 1 on single number | 35 | 2 | 40 | 5 |
| 2 on single number | 70 | 4 | 80 | 10 |
| 3 on single number | 105 | 6 | 120 | 15 |
| 4 on single number | 140 | 7 | 140 | 0 |
| 1 on split 17 | 17 | 1 | 20 | 3 |
| 2 on split 34 | 34 | 2 | 40 | 6 |
| 3 on split 50 | 51 | 3 | 60 | 9 |
| 4 on split 68 | 68 | 4 | 80 | 12 |
| 1 number + 1 split | 52 | 3 | 60 | 8 |
| 2 number + 1 split | 87 | 5 | 100 | 13 |
| 3 number + 1 split | 122 | 6 | 120 | 2 extra chips taken |
| 1 number + 2 split | 69 | 4 | 80 | 11 |
| 2 number + 2 split | 104 | 6 | 120 | 16 |
| 3 number + 2 split | 139 | 7 | 140 | 1 |
| 1 number + 3 split | 86 | 5 | 100 | 14 |
| 2 number + 3 split | 121 | 6 | 120 | 1 extra chip taken |
| 3 number + 3 split | 156 | 8 | 160 | 4 |
| | 1456 | | 1580 | 127 |

EXAMPLE 2

| Winning chips | Win in number of chips paid to player | No. of chip-stacks (20 chips each) stacks | chips | Chips cut into chipper machine |
|---|---|---|---|---|
| 1 on single number | 35 | 2 | 40 | 5 |
| 2 on single number | 70 | 4 | 80 | 10 |
| 3 on single number | 105 | 6 | 120 | 15 |
| 4 on single number | 140 | 7 | 140 | 0 |
| 1 on split 17 | 17 | 1 | 20 | 3 |
| 2 on split 34 | 34 | 2 | 40 | 6 |
| 3 on split 51 | 51 | 3 | 60 | 9 |
| 4 on split 68 | 68 | 4 | 80 | 12 |
| 1 number + 1 split | 52 | 3 | 60 | 8 |
| 2 number + 1 split | 87 | 5 | 100 | 13 |
| 3 number + 1 split | 122 | 7 | 140 | 18 |
| 1 number + 2 split | 69 | 4 | 80 | 11 |
| 2 number + 2 split | 104 | 6 | 120 | 16 |
| 3 number + 2 split | 139 | 7 | 140 | 1 |
| 1 number + 3 split | 86 | 5 | 100 | 14 |
| 2 number + 3 split | 121 | 7 | 140 | 19 |
| 3 number + 3 split | 156 | 8 | 160 | 4 |
| | 1456 | | 1620 | 164 |

Thus, in example 1 the player may place one chip on a single number. If this number wins, he will receive 35 chips from the croupier. This means the croupier will take two stacks of 20 chips each, thus totaling 40 chips, will break one of the stacks and will return five chips into the chipper machine. If the patron has played two chips on a single number, then his win is 70 chips. For this, the croupier will take four full stacks totaling 80 chips and will return 10 chips into the chipper machine. Similarly, if the player plays three chips on a single number and wins, then the croupier has to give him 105 chips. For this the croupier will take six chip stacks, will break one of them and return 15 chips to the chipper machine. Should the patron have played 4 chips on a single number, then his total win would be 140 chips, equal to 7 full stacks.

The other possible combinations can be understood in the same sense. Of interest for this example is the case when the player places three chips on a number and one chip on a split (which will also involve the same number). In this case the three chips on the one number means a win of 105 chips, and the one chip on the split means a win of 17 chips, and the sum total 105+17=122 chips.

It would be possible for the croupier to take seven stacks and return 18 to the chipper machine. However, in the case of example 1, the house rules of the casino tell the croupier that with a number such as this, he should only take six full stacks, totaling 120 chips, and extract two further chips from the chipper machine.

Another example, where the croupier, operating in accordance with the house rules of a particular casino, takes an extra chip from the chipper machine, is shown in the penultimate entry of example 1. Here the patron has bet two chips on a single number and three chips on a split, which will also involve the single number. For the two chips on the single number he will have won a total of 70 chips, and for the three chips on a split, he will have won 3×17=51 chips. The total of 121 chips (70+51=121) is paid to the patron by the croupier by taking six full stacks and one extra chip from the chipper machine.

Clearly, whenever the player loses, his chips are placed by the croupier in the chipper machine. Since full stacks are formed by the croupier from chips taken from the individual columns of the chipper machine, all the chips paid to the patron have been through the chipper machine and thus counted by the system.

Thus, if the wins are distributed equally, the total number of chips in the chip stacks summed over all these examples is 1580, of which 1456 have been paid to the patron, and 130 have been returned to the chipper machine. Since three extra chips were taken from the chipper machine, in fact a total of 127 were returned to the chipper machine. 127 represents 8.52% of 1580. Accordingly, for this particular casino, the total number of chips having passed through particular patrons through the chipper machine should be reduced by 8.52% to arrive at a value which, while still not 100% accurate, nevertheless represents a good estimate of the total amount bet by the patron sufficient for subsequent analysis.

In example 2, different house rules apply. In this case no extra chips are taken from the chipper machine, but rather a whole number of stacks is always broken, with chips being returned to the chipper machine. Thus, whereas for three chips placed on a number and one chip placed on a split, two extra chips were taken from the chipper machine in example 1. Example 2 provides for the croupier to take seven whole stacks and to break one stack and return 19 chips to the chipper machine rather than taking one extra chip from the chipper machine as in example 1.

The result in the present case is that a total of 1620 chips have been through the chipper machine, 1456 have been returned to the player and the number of chips counted by the chipper machine is higher by 164 than the total amount bet by the player. Thus, in this case, a correction factor of 11.26% can be considered as appropriate. Again, it must be noted that this is not an absolutely accurate calculation of a total amount bet by the patron, but is a statistically reasonable approach to assessing the total amount bet by the patron, based on an observation of a patron's playing behavior over a long period of time.

The assessment of the player's total turnover in this way is important for several reasons. First of all, the turnover is the win potential for the casino from this patron and the base for "Frequent Player Programs", it enables the casino to see whether the patron is an important patron of the casino and whether special attention should be paid to him to encourage him to continue using the casino. Secondly, for such an important patron, it would be possible to build up a data base over a longer period of time showing whether the total amounts won or loss in relation to turnover are reasonable having regard to the house advantage or whether there is some element of the patron's play which is suspicious. Thirdly, the assessment of the total amount bet by each patron is the key to assessing the turnover of the croupier and to monitoring the performance of the croupier.

c) Total Turnover of the Croupier

As mentioned above, it is conventional for croupiers to work for periods of about 45 minutes and to then take a break. By requiring the croupier to sign on and sign off at the table, which can be done by drawing his card through the card reader, it is possible for the computer 64 to recognize which croupier is present at the table and for the play during the period in which a particular croupier is working at the table to be associated uniquely with that croupier.

It is not necessary for the croupier to both sign on and sign off. The signing on of one croupier can automatically be used to sign off the previous one. This is preferred because it reduces the burden on the croupier.

Through the signing on and off of the croupiers, the computer system is put in the position of being able to associate activities at the table with a particular croupier. This is necessary to detect the croupier's performance.

The total turnover achieved by a croupier in any one working period is simply the sum of the total amounts bet by the individual patrons during this period.

It was already explained above in detail under section b) how the turnover of individual patrons is assessed. By knowing the time at which a croupier arrives at the table and subsequently leaves it, it is possible to deduce from the data relating to the total amount bet by a patron, as stored by the central processing unit 64 and based on information from the chipper machine, the amount the particular patron bet during a particular working period of the croupier concerned. This also makes it possible to take account of people arriving at or leaving the table during such a working period. It will be appreciated that the computer 64 when recording pieces of information, such as the sorting of a number of color chips by the chipper machine 14, or a payout from the chip tray 16, will record a time against each such piece of data and that the different time entries can be used to associate the total amount bet by a patron within the working period, with the croupier controlling the gaming at the table during that working period.

d) Win or Loss of the Croupier

To determine the win and loss achieved by the croupier the financial status of the table at the beginning and the end of a working period is captured. The financial table status of a table is determined by the cash and marker drop and the chip tray inventory relative to the opening inventory when the table opened or the shift started. Non gaming influences on the chip tray such as chip fills and credits from and to the chip bank have to be accounted for by the computer system 64. Again, the signing on and off of the croupier results in time signals, which enable drops made by the individual patrons and the taking of winnings during the working period to be associated by the central processing unit 64 with a particular croupier. The win and loss determined in this way is not strictly speaking accurate because it does not take account of the influence of the different quantity of color chips which are in the patron's possession at the start and end of the play. However, if the croupier's performance is measured over a sufficient number of working periods, the influence of the color chips held by the patrons balances out over an adequately long period, so that a high level of confidence can be achieved that the assessment of the croupier's performance is correct.

This possibility of summing the total amount won or lost by a croupier over a longer period of time and simultaneously knowing the total turnover achieved by the croupier in that period of time provides a very powerful tool for analyzing the croupier's performance. As already mentioned, there is a known house advantage for the casino, so that statistically speaking over a longer period of time the casino should have made a win of 2.7% of the total turnover for French roulette, with a single zero, or 5.28% for American roulette with a double zero. Thus, a good croupier is one who achieves a high turnover and the house advantage based on that turnover.

On the other hand, when the turnover is high, but the net win by the croupier falls significantly short of the house advantage, this is suspicious and requires further investigation. It is natural, in a game of chance, for the croupier to have some days in which his net win is low, or in which he even makes a loss. However, on average he should be achieving the house advantage. Should statistical observation, however, show that the croupier's overall performance is significantly below the house advantage, and that the periods in which his performance is poorest correspond to a particular patron participating in the game of roulette and making a significant win, then this suggests that there may be some collusion between the croupier and the patron, for example that the croupier is indulging in so-called sector spinning and has given the patron the tip that he should place his bets on particular numbers in order to have an increased chance of winning.

As further confirmation of such a suspicion, it will be possible to analyze the statistical information from the detector 28 to see if this also correlates with particular wins by a particular patron.

This statistical assessment of a croupier's performance can, for example, take place on the following basis:

For French roulette (single zero) the mean win for a randomly placed bet of one chip is $\mu$=0.0270 chips, with a standard deviation of $\sigma$=4.113 chips. For American roulette (double zero), it is $\mu$=0.0528 and $\sigma$=4.068 chips.

As a rough assessment, it can be assumed that for each spin of the roulette wheel there are 60 stakes (individual bets) placed on the table, that the croupier performs 40 spins each shift and does 40 shifts a week. Based on this assumption, the following Table I reveals the number of weeks a croupier has to be observed to retrieve relevant assessment data.

TABLE I

Confidence Levels in Croupier Assessment

| Pockets | Confidence Coefficient | Deviation | Number of bets | Weeks |
|---|---|---|---|---|
| 37% | 90% | 33% | 342 000 | 3.6 |
| | | 50% | 152 000 | 1.6 |
| | | 100% | 38 000 | 0.4 |
| | 95% | 33% | 564 000 | 5.9 |
| | | 50% | 250 000 | 2.6 |
| | | 100% | 63 000 | 0.7 |
| | 99% | 33% | 1 130 000 | 11.8 |
| | | 50% | 501 000 | 5.2 |
| | | 100% | 125 000 | 1.3 |
| 38 | 90% | 33% | 88 000 | 0.9 |
| | | 50% | 39 000 | 0.4 |
| | | 100% | 9 800 | 0.1 |
| | 95% | 33% | 145 000 | 1.5 |
| | | 50% | 64 000 | 0.7 |
| | | 100% | 16 000 | 0.2 |
| | 99% | 33% | 290 000 | 3.0 |
| | | 50% | 129 000 | 1.3 |
| | | 100% | 32 000 | 0.3 |

Furthermore, the table shows only negative deviations from the expected win (one sided test), as a higher win than the expected win could never harm a casino.

Referring now to FIG. 7, the shaded columns in the diagram show the win a certain croupier produces for the casino. Having observed a croupier for at least 25 days, average win data is relevant. So if the win for this croupier falls under the dotted line after more than 25 days of observation, one can be sure to 90% that this croupier produces an average win which is 33% less than the average casino win.

Another factor of uncertainty in croupier rating for American Roulette is the fact that wheel checks (value chips) in player's hands cannot be registered by the electronic chip tray and thus might cause inaccuracies in chip tray measurement. Studies have shown that uncertain wheel check positions increase the observation period by only 5.5%. This corresponds to two further days maximum, if the results derived should be within a confidence level of 95%.

As further background to the present invention some statistical details will now be given with respect to the statistical background of roulette:

Win, Mean and Standard Deviation

The means of the casino's win for the single zero and the double zero roulette and their standard deviations can approximately be calculated from the following Tables II and III:

TABLE II

Means and standard deviations for different bets, assuming a one chip stake, at the game of roulette with 37 numbers (single zero).

| Numbers in Bet | Possibilities | Possible Loss | Possible Win | Win Probability | Mean | Variance | Standard Deviation |
|---|---|---|---|---|---|---|---|
| 1 | 37 = 23.57% | 35 | 1 | 0.0270 | 0.0270 | 34.080 | 5.838 |
| 2 | 60 = 38.22% | 17 | 1 | 0.0541 | 0.0270 | 16.567 | 4.070 |
| 3 | 14 = 8.92% | 11 | 1 | 0.0811 | 0.0270 | 10.729 | 3.276 |
| 4 | 23 = 14.65% | 8 | 1 | 0.1081 | 0.0270 | 7.810 | 2.795 |
| 6 | 11 = 7.01% | 5 | 1 | 0.1622 | 0.0270 | 4.891 | 2.212 |
| 12 | 6 = 3.82% | 2 | 1 | 0.3243 | 0.0270 | 1.972 | 1.404 |
| 18 | 6 = 3.82% | 1 | 1 | 0.4865 | 0.0270 | 0.999 | 1.000 |

TABLE III

Means and standard deviations for different bets, assuming a one chip stake, at the game of roulette with 38 numbers (double zero).

| Numbers in Bet | Possibilities | Possible Loss | Possible Win | Win Probability | Mean | Variance | Standard Deviation |
|---|---|---|---|---|---|---|---|
| 1 | 38 = 23.60% | 35 | 1 | 0.0263 | 0.0526 | 33.208 | 5.763 |
| 2 | 62 = 38.51% | 17 | 1 | 0.0526 | 0.0526 | 16.155 | 4.019 |
| 3 | 15 = 9.32% | 11 | 1 | 0.0789 | 0.0526 | 10.471 | 3.236 |
| 4 | 22 = 13.66% | 8 | 1 | 0.1053 | 0.0526 | 7.629 | 2.762 |
| 5 | 1 = 0.62% | 6 | 1 | 0.1358 | 0.0789 | 5.599 | 2.366 |
| 6 | 11 = 6.83% | 5 | 1 | 0.1579 | 0.0526 | 4.787 | 2.188 |
| 12 | 6 = 3.73% | 2 | 1 | 0.3158 | 0.0526 | 1.954 | 1.394 |
| 18 | 6 = 3.73% | 1 | 1 | 0.4737 | 0.0526 | 0.997 | 0.999 |

To obtain overall estimations for the mean and the standard deviation, one would have to know the average frequencies for each bet. As a first approach, one can take the number of possibilities for each bet given in Table II and Table III, and calculate averages for mean and variance. This leads to:

TABLE IV

Overall means and standard deviations for the single zero and the double zero roulette

| Roulette Type | Mean ($\mu$) | Variance ($\sigma^2$) | Std. Deviation ($\sigma$) |
|---|---|---|---|
| Single Zero | 0.0270 | 16.920 | 4.113 |
| Double Zero | 0.0528 | 16.549 | 4.068 |

Minimum Sample Size Estimation

As well known in statistics, the mean X of a sample of size N can be compared against the mean $\mu$ of the whole distribution by calculating $$z = \frac{X - \mu}{\sigma} \cdot \sqrt{N} \qquad \text{Formula 1}$$

and comparing the result z, which is the normalized deviation of the sample mean X of the corresponding overall distribution mean $\mu$, with a table of the quantiles of the Gaussian distribution. Of course, this depends on the assumption that the sample has been taken from a normally distributed entity, but from the LINDEBERG-LÉVY theorem we know that the distribution of a sample's mean is asymptotically normal, as long as both a mean and a variance exists for the distribution the sample is taken from. This means that Formula 1 can be taken as a good approximation as long as N is not too small.

From Formula 1, one can easily derive $$N = \left(\frac{z \cdot \sigma}{X - \mu}\right), \qquad \text{Formula 2}$$

which is an estimate for the sample size needed to detect a given deviation from the distribution's mean.

As an example for the single zero roulette, if one wants to detect a 33% deviation from the mean with a confidence coefficient of 90%, N has to be approximately 342 000. This means that the croupier has to be observed for about three and a half weeks to get the desired result.

The mean for the double zero roulette is about double the one for the double zero roulette. Therefore, the sample size necessary is much less; it has to be approximately N=88 000. Using the assumptions above, we find the time period necessary to detect the mentioned deviation to be less than one week.

Recalculating the sample sizes necessary to detect a 50% deviation at a confidence level of 95%, one obtains N=250 000, corresponding to about two and a half weeks (single zero) and N=64 000, corresponding to about five days (double zero).

As mentioned above, wheel checks (value chips held by patrons at the table) can cause problems.

Problem Description

The variance of the win, as shown in Tab II, Tab. III and Tab. IV, has to be increased due to the uncertainty caused by the unknown amount of wheel checks possessed by the players at the table at the time of shift change. To obtain an estimate for this influence, some assumptions must again be made, which—on an average—are fulfilled in practice:

At each time, there are five players at the table;

The croupier performs 40 spins each shift;

At each spin there are 60 stakes placed on the table;

Each stake contains 2 chips;

The amount of wheel checks lies between 0 and 100 (both included) and is evenly distributed.

Mean and Variance (Wheel Checks)

In general, mean and variance of an evenly distributed, discrete random variable with consecutive integer values from the interval [a,b] can be computed as follows $$\mu = \frac{b-a}{2}, \quad \text{Formula 3}$$

$$\sigma^2 = \frac{(n-1)\cdot(n+1)}{12}, \text{ where } n = b-a+1. \quad \text{Formula 4}$$

In the present case (a=0, b=100) the results are $\mu$=50 and $2\sigma^2$=850.

From the assumptions made in the section "Problem Description", it is obvious that the distribution of the wheel checks held by all players at shift change is the sum of five independent distributions, thus having a mean of $\mu$=5×50=250 and a variance $\sigma^2$=5×850=4 250. Therefore, mean and variance for the difference between begin and end of a croupier's shift are $\mu$=250−250=0 and $\sigma^2$=4250+4250=8 500.

Mean and Variance (Croupier's Win)

Following the assumptions above, a croupier has to handle 2 400 stakes with a total of 4 800 chips in one shift. The mean and standard deviation for his win can be calculated, based on the results given in Table IV. From there, $\mu$ has to be multiplied by 2 (average number of chips per stake) and by 2 400 (number of stakes), while $\sigma^2$ has to multiplied by 22 and by 2 400. The results are summarized in Table V:

TABLE V

Means and standard deviations for a croupier's win during one shift, not including the uncertainty caused by wheel checks.

| Roulette Type | Mean ($\mu$) | Variance ($\sigma^2$) | Std. Deviation ($\sigma$) |
|---|---|---|---|
| Single Zero | 129.73 | 162 432.79 | 403.03 |
| Double Zero | 253.42 | 158 865.91 | 398.58 |

How Wheel Checks Effect Sample Size

The above discussion shows how the variance of the croupier's win within one shift increases by approximately 5.5% for both types of roulette, due to the uncertainty caused by the wheel checks. From Formula 2, it can be seen that the sample size depends linearly on the variance of the entity the sample is taken from, and therefore increases by the same ratio.

e) Working speed of the Croupier

One factor of interest to a casino is how quickly the croupier works. The quicker he works, the more turnover is achieved within a particular period of time and the greater is the profit to the casino. One simple measure for the working speed of a croupier is to count, for example, the number of spins of the roulette wheel he achieves per hour, or an equivalent value such as the average duration of a spin of the roulette wheel 12. This information can readily be obtained by the central processing unit 64 either from the detector 28 or by analyzing the periods of activity of, for example, the chipper machine 14. The activity of the chipper machine will typically be at an increased level at the end of each spin of the roulette wheel when the croupier collects the losing bets.

Another useful measure of the croupier's performance is the total number of chips sorted by the chipper machine in a particular period. Clearly, if more players are present at the table, the duration of each spin of the roulette wheel, the collection of lost bets and the payment of winnings will take rather longer than if only one or two patrons are playing at the table.

f) Section Spinning Indication

The detector 28, which can be designed in accordance with the PCT application with the publication number WO95/28996 provides information on the speed of the ball in the upper rim of the roulette wheel, the speed and direction of the cylinder of the roulette wheel, and the relative position of the cylinder to the ball and to the segment into which the ball falls. This information may be used to detect the position of the ball in the moving roulette wheel and illuminate the display to indicate the winning number to the patrons and to collect information for statistical processing. It is stated that the latter enables the casino to check that the wheel and its croupier are operating fairly and without bias. However, no particulars of how this check is made are given.

The present teaching recognizes that the data achieved from the detector can be used to see if it is statistically significant. For example, the frequency with which a particular number occurs should be randomly distributed. Equally, a check can be made to see whether the set of parameters such as the speed of and the phase between the cylinder and the ball are randomly scattered out as with other croupiers or if the parameters indicate a rhythmic spinning by this croupier which again suggests that section spinning could be practiced.

Finally, it should be noted that not all of the electronic items recited in connection with FIG. 2 are necessary for each of the assessments mentioned above. All the comments made below assume that a central processing unit 64 or at least a computer associated with the particular gaming table or a group of gaming tables is present for data storage and analysis.

Thus, for assessing the patrons, so-called patron rating (total amount bet), it will be sufficient to provide only a chipper machine 14 with an interface 62 and a table terminal 24, into which the croupier would be expected to type in all other relevant data. However, to make the system more comfortable for the croupier to use, it is preferable to provide a chip value and payout display 30 in accordance with FIG. 7.

To determine the patron win or loss, it is necessary to have the table terminal 24 and the electronic chip tray 16 and it will help the croupier a lot to have the chip value and payout display 30.

To perform the croupier assessments, it is necessary to have the chipper machine 14 with the interface 62 and the table terminal 24. In order to determine the number of spins per unit time, it is necessary to either derive this information from the activity of the chipper machine or to provide the detector 28. To obtain information concerning the net win or loss by the croupier, it is necessary to have as a minimum the table terminal 24 and the electronic chip tray 16. In order to determine possible section spinning, the minimum requirement is the table terminal 24 and the automatic number detection system 28.

The roulette number display 30 and the automatic number detection system 28 are useful for providing customer information.

It will, of course, be appreciated that the realization of the table terminal with various graphic touch screens and the precise layouts of these touch screens and the information contained on them are matters which can be varied significantly without departing from the present teaching. The versions given here represent the best embodiment known to the inventor.

What is claimed is:

1. A method for determining the total amount bet by individual patrons participating in a plurality of spins of a roulette game at a gaming table fitted with a chipper machine and an intelligent table terminal, the method comprising the steps of:

interfacing the chipper sorting machine to the table terminal allocating a patron a chip color at the table terminal counting the number of color chips sorted by the chipper machine per color associating the number of color chips sorted by the chipper machine per color with the patron and determining the total amount bet by that patron by mathematically linking the chip value of the color chip of the patron with the number of chips of the individual color sorted by the chipper machine in the time period in which the color chip is associated with that patron.

2. A method in accordance with claim 1 including the step of entering the chip value at the table terminal if the color chip is not played with the default table minimum value.

3. A method in accordance with claim 1 including the step of allocating a patron not using color chips an individual value chip.

4. A method in accordance with claim 1 including the step of compensating for chips sorted but not played by reducing the number of sorted chips by a percentage.

5. A method in accordance with claim 1 including the step of storing information relating to the number of chips sorted per color and spin in a data processing system and associating time signals with any such storage information.

6. A method in accordance with claim 1 including the step of displaying the color chips on a display board indicating the value of color chips allocated to patrons on the display board.

7. A method in accordance with claim 6 including the step of offering a win calculator at the table terminal on which the number of winning chips per chance for an individual chip color or chip value are entered, and calculating the numbers of chips won and a payout based on the number of winning chips per chance, the number of chips won per chance and the chip value of the color chip using the chip value of the color chip known to the system.

8. A method in accordance with claim 7 including the step of showing some or all of the number of winning chip per chance, the number of chips won per chance, the total number of chips won, and/or the total value of chips won.

9. A method in accordance with claim 8 including the step of proposing the said payout in the form of a number of color chips and a balance in an amount of value chips, taking into account the limited number of color chips available on the table.

10. A method in accordance with claim 1 including the further step of determining the performance of the croupier from information stored in the data processing system at the start of the croupier gaming and during the croupier gaming at the table during the playing of a plurality of spins, e.g. by determining the average duration of a spin, the number of patrons, the number of color chips played or sorted.

11. A method for determining the total amount bet by individual patrons participating in a plurality of spins of a roulette game at a gaming table, in which said individual patrons play using chips having different colors, a respective color being associated with each said individual patron, there being a chipper machine for receiving chips collected by a croupier during the game of roulette and for arranging the chips according to their coloring in respective columns, from which the coupier can take stacks of a predetermined number of chips of a respective color, each chip of a particular color having an associated monetary value, the method comprising the steps of counting the total number of chips of each color passing through the chipper machine during the period each individual patron is present at said gaming table, and establishing the total monetary value of the chips of each color passing through the chipper machine.

12. A method in accordance with claim 11 and including the further step of estimating from said number of chips or from said total monetary value the total amount bet by an individual patron playing with chips of the said color.

13. A method in accordance with claim 12, wherein the step of estimating comprises the step of subtracting from the total number of chips of each color passing through the chipper machine, or from said monetary value a percentage reflecting the house rules on the breaking of stacks.

14. A method, in particular in accordance with claim 11, of determining the total win or loss by a patron participating in a game of roulette, the method comprising the steps of determining the total amount of all pay-ins made during the game by capturing at a table terminal a piece of information identifying the player, and each buy-in or drop amount irrespective of the method of payment, determining the walk amount at the end of the patron's game in the form of value chips and/or cancelled markers, and establishing the difference between the total amount of all pay-ins and the walk amount.

15. A method in accordance with claim 14, wherein pay-ins in the form of value chips are detected automatically by the change in value of a chip tray associated with the roulette table.

16. A method in accordance with claim 11 and comprising the further steps of determining when a new croupier arrives at the gaming table, summing the total amounts bet by all patrons playing at the gaming table during the period in which the new croupier is working at the gaming table with reference to the chips of all colors sorted by the chipper machine during this period, and electronically associating the sum of the total amounts bet to the croupier.

17. A method in accordance with claim 16, wherein a statistical correction is added to said sum of the total amounts bet to reflect the numbers of chips returned to the chipper machine due to the breaking of chip stacks when paying winnings to individual patrons.

18. A method in accordance with claim 16, comprising recording the sum of the total amount bet during each working period of a particular croupier for a plurality of working periods of that croupier and forming a total sum of the amounts bet over a plurality of working periods of said croupier.

* * * * *